United States Patent
Izumi et al.

(10) Patent No.: US 11,972,903 B2
(45) Date of Patent: Apr. 30, 2024

(54) MULTILAYER CERAMIC CAPACITOR

(71) Applicant: Murata Manufacturing Co., Ltd., Nagaokakyo (JP)

(72) Inventors: Tatsuya Izumi, Nagaokakyo (JP); Yuu Mikami, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 319 days.

(21) Appl. No.: 17/382,418

(22) Filed: Jul. 22, 2021

(65) Prior Publication Data
US 2022/0059288 A1 Feb. 24, 2022

(30) Foreign Application Priority Data

Aug. 20, 2020 (JP) ................. 2020-139665

(51) Int. Cl.
*H01G 4/30* (2006.01)
*C04B 35/465* (2006.01)
*C04B 35/491* (2006.01)
*H01G 4/008* (2006.01)
*H01G 4/012* (2006.01)
*H01G 4/12* (2006.01)

(52) U.S. Cl.
CPC .............. *H01G 4/30* (2013.01); *C04B 35/465* (2013.01); *C04B 35/491* (2013.01); *H01G 4/008* (2013.01);
(Continued)

(58) Field of Classification Search
CPC ........ H01G 4/30; H01G 4/012; H01G 4/1209; H01G 4/1236; H01G 4/1218;
(Continued)

(56) References Cited

U.S. PATENT DOCUMENTS

2006/0250747 A1* 11/2006 Takashima ............... H01G 4/30
361/272
2009/0046410 A1 2/2009 Takeoka
(Continued)

FOREIGN PATENT DOCUMENTS

CN 103578757 A 2/2014
CN 103928232 A 7/2014
(Continued)

OTHER PUBLICATIONS

Stoch, P., et al. "Crystal structure and ab initio calculations of CaZrO3." Journal of the European Ceramic Society 32.3 (2012): 665-670., hereinafter referred to as Stoch (Year: 2012).*
(Continued)

*Primary Examiner* — Bryan D. Ripa
*Assistant Examiner* — Cameron K Miller
(74) *Attorney, Agent, or Firm* — Keating & Bennett, LLP

(57) ABSTRACT

A multilayer ceramic capacitor includes a multilayer body including a plurality of dielectric layers and a plurality of internal electrodes, wherein the dielectric layers and the internal electrodes are stacked alternately; and external electrodes provided on end surfaces of the multilayer body and electrically connected to the internal electrodes, wherein the dielectric layers each include main crystal grains including calcium and/or strontium, and zirconium; and an additive component including lithium, the internal electrodes include copper, and the dielectric layers have lithium concentrations with a standard deviation of about 1.03 atomic percent or less in the thickness direction.

19 Claims, 6 Drawing Sheets

(52) U.S. Cl.
CPC ............ *H01G 4/0085* (2013.01); *H01G 4/012* (2013.01); *H01G 4/1209* (2013.01); *C04B 2235/3248* (2013.01)

(58) Field of Classification Search
CPC .... H01G 4/2325; H01G 4/232; C04B 35/465; C04B 35/491; C04B 2235/3248
See application file for complete search history.

(56) References Cited

U.S. PATENT DOCUMENTS

2013/0201602 A1\* 8/2013 Takeoka ................ C04B 35/486
29/25.42
2014/0043722 A1 2/2014 Hirata et al.

FOREIGN PATENT DOCUMENTS

| JP | H06349666 | A | 12/1994 |
| JP | H1097947 | A | 4/1998 |
| JP | 2009-007209 | A | 1/2009 |
| JP | 2019-153778 | A | 9/2019 |
| WO | 2012043427 | A1 | 4/2012 |

OTHER PUBLICATIONS

Office Action in JP2020-139665, dated Apr. 4, 2023, 2 pages.
First Office Action in CN202110905602.1, dated Dec. 28, 2022, 11 pages.

\* cited by examiner

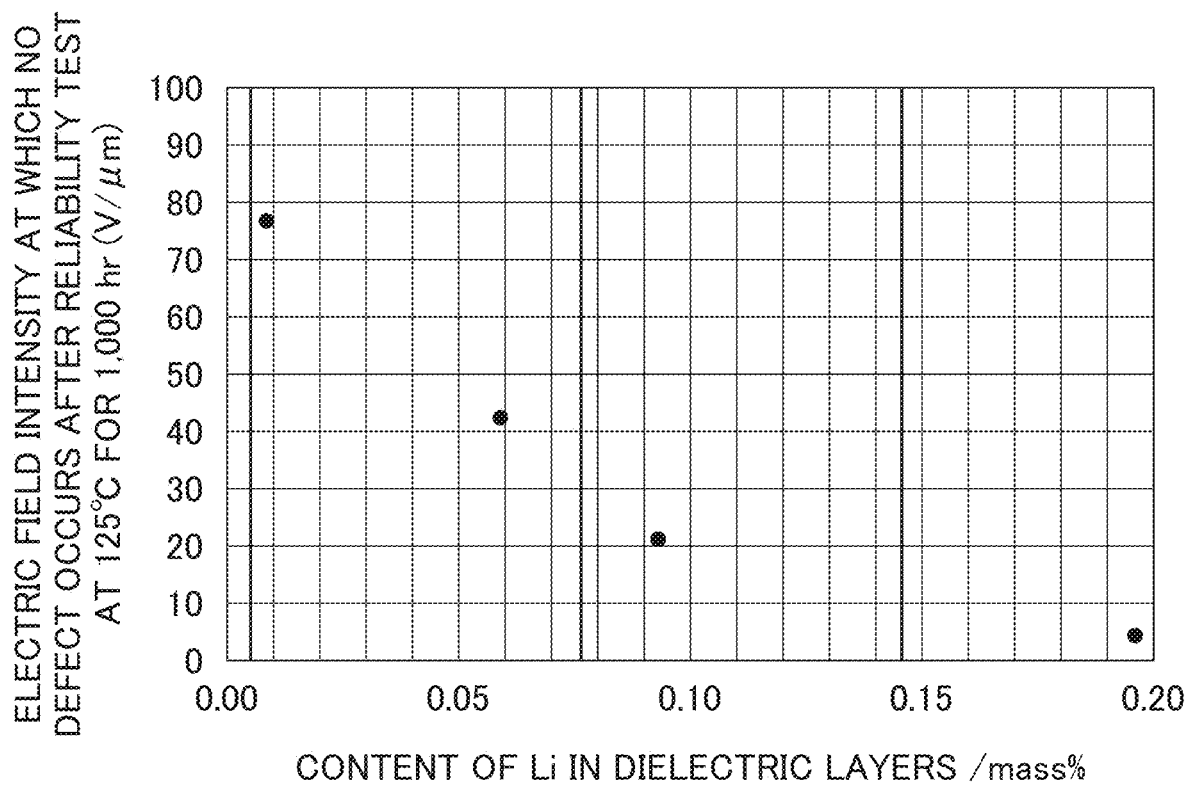

Li+
MC: 6; TC: 2.590e+004

Cu+
MC: 15; TC: 1.022e+005

Overlay of Li+, Li+, Cu+

MULTILAYER CERAMIC CAPACITOR

CROSS REFERENCE TO RELATED APPLICATIONS

This application is based on and claims the benefit of priority from Japanese Patent Application No. 2020-139665, filed on Aug. 20, 2020, the content of which is incorporated herein by reference.

BACKGROUND OF THE INVENTION

1. Field of the Invention

The present invention relates to a multilayer ceramic capacitor.

2. Description of the Related Art

In recent years, the demand for multilayer ceramic capacitors has rapidly increased to meet a rapidly increasing demand for smaller and higher density electronic devices. Multilayer ceramic capacitors, which are also used for applications in severe temperature environments, such as on-vehicle applications, are required to be highly reliable as well as inexpensive. To meet such demands, a multilayer ceramic capacitor is proposed that includes $(Ca,Sr)ZrO_3$ ceramic layers and copper (Cu) internal electrodes.

For example, Japanese Unexamined Patent Application, Publication No. 2019-153778 discloses a multilayer ceramic capacitor including a multilayer ceramic body having a substantially rectangular parallelepiped shape and including alternately stacked ceramic dielectric layers and internal electrode layers in which the ceramic dielectric layers include Ca, Zr, and O as main components and include an alkali metal, and the internal electrode layers include Cu as a main component and an alkali metal-free additive including Ca, Zr, and O; and at least two external electrodes connected to the internal electrode layers extending to end surfaces of the multilayer body (see claim 3 of Japanese Unexamined Patent Application, Publication No. 2019-153778). Japanese Unexamined Patent Application, Publication No. 2019-153778 also discloses that the multilayer ceramic capacitor is advantageous in that it is highly reliable even when a high voltage is applied to it (see paragraph [0015] of Japanese Unexamined Patent Application, Publication No. 2019-153778).

Japanese Unexamined Patent Application, Publication No. 2009-007209 discloses a dielectric ceramic represented by the formula: $Ca_xZrO_3+aMn+bLi+cB+dSi$, wherein $0.5 \le a \le 4.0$ mol and $6.0 \le (b+c+d) \le 15.0$ mol based on 100 mol of $Ca_xZrO_3$, $1.00 \le x \le 1.10$, $0.15 \le (b/(c+d)) \le 0.55$, and $0.20 \le (d/c) \le 3.30$ (see claim 1 of Japanese Unexamined Patent Application, Publication No. 2009-007209). Japanese Unexamined Patent Application, Publication No. 2009-007209 also states that the dielectric ceramic is advantageous in that it allows a multilayer ceramic capacitor including Cu internal electrodes to have improved lifetime characteristics (see paragraph [0007] of Japanese Unexamined Patent Application, Publication No. 2009-007209).

The technology proposed in the conventional art is not enough to meet the demand for highly reliable multilayer ceramic capacitors, which has increased in recent years.

In view of the problems described above, the inventors of preferred embodiments of the present invention have conducted extensive studies and, as a result, discovered that variations in the concentration of lithium (Li) in dielectric layers have a significant effect on reliability, and a reduction in such variations is important to improve the reliability of multilayer ceramic capacitors.

SUMMARY OF THE INVENTION

Preferred embodiments of the present invention provide highly reliable multilayer ceramic capacitors.

According to a preferred embodiment of the present invention, a multilayer ceramic capacitor includes a multilayer body including a plurality of dielectric layers and a plurality of internal electrodes, the dielectric layers and the internal electrodes being stacked alternately, and external electrodes provided on end surfaces of the multilayer body and electrically connected to the internal electrodes. The dielectric layers each include main crystal grains including calcium (Ca) and/or strontium (Sr), and zirconium (Zr); and an additive component including lithium (Li). The internal electrodes include copper (Cu). The dielectric layers include lithium (Li) concentrations with a standard deviation of about 1.03 atomic percent or less in the thickness direction.

Preferred embodiments of the present invention provide highly reliable multilayer ceramic capacitors.

The above and other elements, features, steps, characteristics, and advantages of the present invention will become more apparent from the following detailed description of the preferred embodiments with reference to the attached drawings.

BRIEF DESCRIPTION OF THE DRAWINGS

FIG. 5 is a graph showing the relationship between the Li content of dielectric layers and the electric field intensity at which the insulation resistance remains not less than about $10^6 \Omega$ in a high-temperature load test.

DETAILED DESCRIPTION OF THE PREFERRED EMBODIMENTS

Preferred embodiments of the present invention will be described with reference to the drawings. It will be understood that the preferred embodiments shown below are not intended to limit the present invention and may be altered or modified in various ways without departing from the gist of the present invention. A combination of two or more of the different preferred embodiments shown below will also fall within the preferred embodiments.

Multilayer Ceramic Capacitor

A multilayer ceramic capacitor according to a preferred embodiment of the present invention includes a multilayer body and external electrodes provided on end surfaces of the multilayer body. The multilayer body includes multiple dielectric layers and multiple internal electrodes, both of which are stacked alternately. The external electrodes are electrically connected to the internal electrodes extending to the end surfaces.

Figure 1:
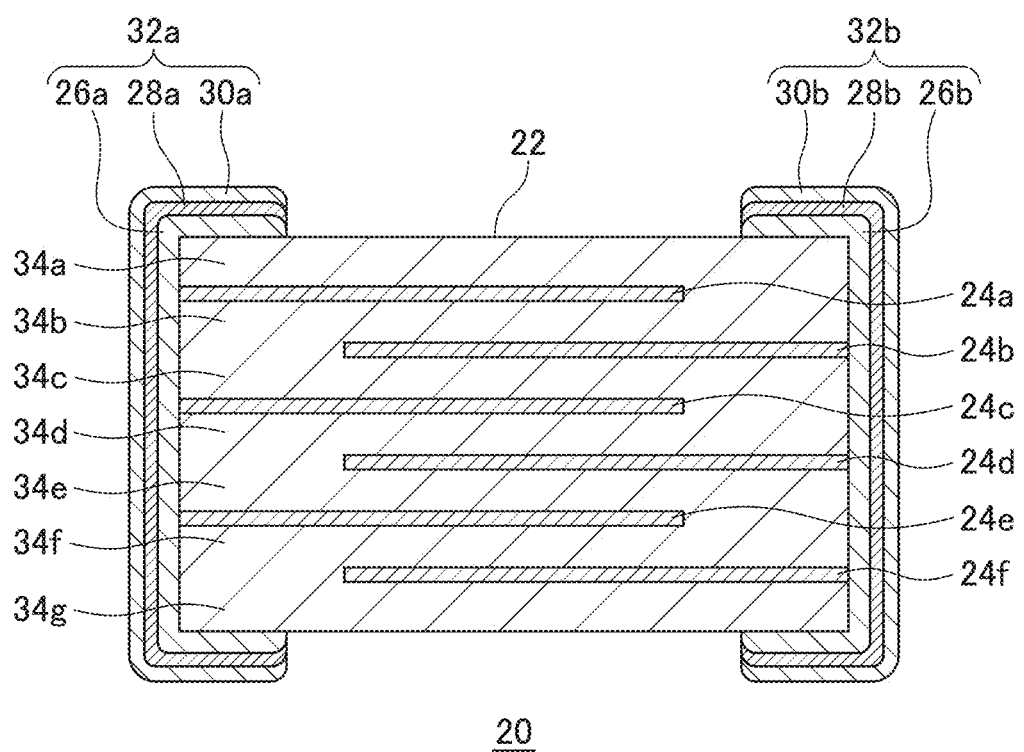
FIG. 1 is a cross-sectional view showing a multilayer ceramic capacitor according to a first preferred embodiment of the present invention.

A multilayer ceramic capacitor according to a first preferred embodiment of the present invention is shown in the cross-sectional view of FIG. 1. The multilayer ceramic capacitor 20 includes a multilayer body 22 including a sintered material, and internal electrodes 24a to 24f embedded in the multilayer body 22. Specifically, the multilayer body 22 is a sintered body including dielectric layers 34a to 34g and internal electrodes 24a to 24f, which have been alternately stacked and then fired. An external electrode 32a is provided on a first one of the end surfaces of the multilayer body 22, and another external electrode 32b is provided on a second one of the end surfaces of the multilayer body 22. The external electrode 32a includes a base electrode layer 26a, a first upper electrode layer 28a, and a second upper electrode layer 30a. The external electrode 32b includes a base electrode layer 26b, a first upper electrode layer 28b, and a second upper electrode layer 30b. The internal electrodes 24a, 24c, and 24e are electrically connected to the external electrode 32a. The internal electrodes 24b, 24d, and 24f are electrically connected to the external electrode 32b. An electrostatic capacitance is provided between the opposing surfaces of the internal electrodes 24a and 24b, 24c and 24d, and 24e and 24f.

The multilayer ceramic capacitor 20 has a rectangular or substantially rectangular parallelepiped shape. As used herein, the term "substantially rectangular parallelepiped" is intended to also include a modified rectangular parallelepiped shape with a rounded side or sides and/or a rounded corner or corners. The longitudinal direction L of the multilayer ceramic capacitor 20 is defined as the direction in which a pair of the external electrodes 32a and 32b face each other. The thickness direction T is defined as the direction in which the dielectric layers 34a to 34g and the internal electrodes 24a to 24f are stacked. The width direction W is defined as the direction perpendicular to both of the longitudinal direction L and the thickness direction T. The surface defined by the longitudinal direction L and the thickness direction is referred to as the LT surface, and the surface defined by the width direction W and the thickness direction T is referred to as the WT surface.

The dielectric layers each include main crystal grains including calcium (Ca) and/or strontium (Sr), and zirconium (Zr), and an additive component including lithium (Li), for example. As used herein, the term "main crystal grains" refers to a component defining 50% by mass or more of each dielectric layer. The term "additive component" refers to a component defining less than 50% by mass of each dielectric layer.

The main crystal grains each include a perovskite compound. The perovskite compound includes either or both of calcium (Ca) and strontium (Sr), and further includes zirconium (Zr). Specifically, the perovskite compound may be any one of a calcium zirconate ($CaZrO_3$)-based compound, a strontium zirconate ($SrZrO_3$)-based compound, and a calcium strontium zirconate (($Ca,Sr$)$ZrO_3$)-based compound, for example. The perovskite compound may include, for example, barium (Ba), titanium (Ti), and/or hafnium (Hf) as an optional component or components. These compounds are collectively referred to as "($Ca,Sr$)$ZrO_3$-based compound".

The ($Ca,Sr$)$ZrO_3$-based perovskite compound has a permittivity that does not significantly vary with temperature and is able to provide a relatively low dielectric loss (tan δ). Therefore, the dielectric layers including main crystal grains of the ($Ca,Sr$)$ZrO_3$-based perovskite compound are able to provide a multilayer ceramic capacitor with a relatively low dielectric loss and a relatively small rate of temperature-dependent change in electrostatic capacitance.

The compound of the main crystal grains does not need to have a strictly stoichiometric composition. In this regard, a perovskite compound with a stoichiometric composition has a composition represented by the general formula $ABO_3$. In the formula, A and B respectively represent an A-site element and a B-site element in the perovskite crystal structure, and the A element and the B element are in a molar ratio of about 1:1. However, the molar ratio of the A-site element to the B-site element may deviate from 1:1 due to fluctuations in production conditions, for example, raw material contents, during actual production of the compound. The oxygen ratio may also deviate from 3. In the first and second preferred embodiments, the above deviations may be included as long as the compound of the main crystal grains has a perovskite crystal structure.

The main crystal grains preferably have a composition represented by the formula: $(Ca_{1-x-y}Sr_xBa_y)_m(Zr_{1-z-\alpha}Ti_zHf_\alpha)O_3$, wherein x is about 0 or more and about 1.0 or less, y is about 0 or more and about 0.4 or less, m is about 1.0 or more and about 1.1 or less, z is about 0 or more and about 0.2 or less, and a is about 0 or more and about 0.3 or less, for example. Ca may be partially or entirely replaced with Sr. Therefore, the molar ratio (x) of Sr is about 0 or more and about 1.0 or less (about 1.000 or less), for example. The molar ratio (y) of Ba is preferably about 0 or more and about 0.4 or less (about 0.400 or less), for example. This makes it possible for the composition to have a small rate of change in electrostatic capacitance. It should be noted that x+y is about 0 or more and about 1.0 or less (about 1.000 or less), for example. The molar ratio (z) of Ti is preferably about 0 or more and about 0.2 or less (about 0.200 or less), for example. Accordingly, the composition is able to maintain a relatively high permittivity and have a relatively low rate of temperature-dependent change in electrostatic capacitance. Further, the composition is also able to be highly reliable at relatively high temperature. The molar ratio (α) of Hf is preferably about 0 or more and about 0.3 or less (about 0.300 or less), for example. Accordingly, the composition to resist a deterioration in sinterability and to have higher reliability at relatively high temperature. It should be noted that z+α is 0 or more and 1.0 or less (1.000 or less), for example. The sum (m) of the molar ratios of Ca, Sr, and Ba is about 1.0 or more (about 1.00 or more) and about 1.1 or less (about 1.10 or less), for example. Ca, Sr, and Ba are elements occupying the A site of the perovskite crystal structure. When the composition is rich in the A site element, the composition is able to resist a deterioration in sinterability and be highly reliable at relatively high temperature while maintaining a relatively low rate of temperature-dependent change in electrostatic capacitance.

The dielectric layers include an additive component including lithium (Li). The additive component may be included as a solid solution in the main crystal grains or may be included as an oxide at grain boundaries or triple points. By including the additive component including Li (Li component), the dielectric layers and the internal electrodes area able to be co-fired. As will be described herein, the internal electrodes include copper (Cu). Cu has a relatively low melting point of about 1,085° C., for example. The Ca(Zr,Ti)O$_3$-based compound in the dielectric layers is less sinterable by itself and cannot be densified at a temperature around the melting point of Cu. Moreover, if the sintering temperature is raised for densification of the main crystal grains, Cu may melt to diffuse into the dielectric layers, which may degrade reliability of the insulation properties. The Li component has a relatively low melting point and provides a sintering aid for the dielectric layers. Therefore, by including the Li component in the dielectric layers, the dielectric layers and the internal electrodes including Cu are able to be simultaneously fired.

The dielectric layers have lithium (Li) concentrations with a standard deviation of about 1.03 atomic percent (at. %) or less in their thickness direction (a thickness-direction Li concentration deviation) of about 1.03 at. % or less, for example. Accordingly, the Li concentration distribution in the thickness direction is relatively uniform within the dielectric layers. As described herein, the term "thickness direction" refers to the direction in which the dielectric layers are stacked. The direction may also be referred to as the direction perpendicular or substantially perpendicular to the dielectric layer surface.

In multilayer ceramic capacitors including a Li component known in the art, the Li component tends to segregate at or near the boundaries in the dielectric layers. Accordingly, the Li concentration distribution in the thickness direction is not uniform within the dielectric layers. The segregation of the Li component will degrade the reliability at high temperature. In particular, the Li-including portion of the dielectric material has a locally lowered insulation resistance, which causes electric field concentration on the Li-including portion during a high-temperature load test. In contrast, in the multilayer ceramic capacitor according to the present preferred embodiment, the Li component is less segregated and the Li concentration distribution is relatively uniform in the thickness direction. Accordingly, the degradation of high-temperature reliability is able to be reduced or prevented. The thickness-direction Li concentration deviation is preferably about 0.87 at. % or less, for example. The thickness-direction Li concentration deviation is preferably as low as possible and preferably has a lower limit of about 0.00 at. %, for example. However, the thickness-direction Li concentration deviation is typically about 0.60 at. % or more, for example.

The dielectric layers preferably have, for example, lithium (Li) concentrations with a standard deviation of, for example, about 1.10 at. % or less in the direction perpendicular to the thickness direction (a standard deviation of about 1.10 at. % or less in their in-plane direction). The in-plane Li concentration distribution is preferably substantially uniform in the dielectric layers, for example. Accordingly, a decrease in high-temperature reliability is able to be significantly reduced or prevented. The in-plane Li concentration deviation is more preferably about 0.97 at. % or less, for example.

The dielectric layers preferably include about 0.005% by mass or more and about 0.145% by mass or less of lithium (Li), for example. When the Li content is maintained at about 0.005% by mass or more, the Li component is able to provide a sintering aid to facilitate co-firing of the dielectric layers and the internal electrodes. When the Li content is kept at about 0.145% by mass or less, excessive growth of the main crystal grains is able to be reduced or prevented, thus further improving of high-temperature reliability. The lithium content is more preferably about 0.076% by mass or less, for example. The Li content described herein refers to the content of the Li component in the dielectric layers of the multilayer ceramic capacitor as manufactured. The Li component may dissipate (volatilize) during the firing step in the manufacture of the multilayer ceramic capacitor. Therefore, the amount of the added Li component may differ from the Li content.

In particular, for example, the dielectric layers preferably have lithium (Li) concentrations with a standard deviation of about 0.87 at. % or less in their thickness direction and lithium (Li) concentrations with a standard deviation of about 0.97 at. % or less in the direction perpendicular to their thickness direction, and preferably include about 0.005% by mass or more and about 0.076% by mass or less of lithium (Li). Accordingly, high-temperature reliability is able to be significantly improved.

The dielectric layers may include an additive component other than lithium (Li). For example, the dielectric layers may include one or more components selected from the group consisting of silicon (Si), manganese (Mn), vanadium (V), magnesium (Mg), calcium (Ca), strontium (Sr), barium (Ba), boron (B), aluminum (Al), and titanium (Ti). The dielectric layers may include any of these additive components as an independent component or as a composite compound. The additive components may be crystalline or vitreous.

The dielectric layers preferably further include one or more elements selected from the group consisting of silicon (Si), manganese (Mn), and vanadium (V), for example. The silicon content is preferably about 0.1% by mass or more and about 4.5% by mass or less and more preferably about 0.3% by mass or more and about 4.5% by mass or less, for example. The manganese content is preferably about 0.3% by mass or more and about 6.0% by mass or less, and the vanadium content is preferably about 0.0% by mass or more and about 0.1% by mass or less, for example.

The dielectric layers each preferably have a thickness of about 1.0 μm or more and about 55.0 μm or less, for example. The number of the dielectric layers is preferably one or more and 50 or less, for example.

Internal Electrodes

The internal electrodes include metallic copper (Cu) as a main component. As described herein, the term "main component" refers to a component providing about 50% by mass or more of the components that form each internal electrode. Copper is a relatively inexpensive base metal. Therefore, the use of copper as an internal electrode component provides a reduction in the overall cost of the multilayer ceramic capacitor. Copper also has a relatively low electric resistance and a relatively low conductor loss. Coupled with the effect of the Ca(Zr,Ti)O$_3$-based compound having a relatively low dielectric loss, such features of copper contribute to reducing the loss of the multilayer ceramic capacitor. Copper also has relatively high oxidation resistance. Accordingly, the dielectric layers and the internal electrodes are able to be simultaneously fired in a more oxidative atmosphere, and thus the reduction of the Ca(Zr,Ti)O$_3$-based compound is able to easily reduced or prevented. In this regard, nickel (Ni) is known, as well as copper (Cu), as a material for the internal electrodes of multilayer ceramic capacitors. However, nickel, which is less resistant to oxidation than copper, should be fired in a more reducing atmosphere. Therefore, the use of nickel internal electrodes may lead to reduction of the Ca(Zr,Ti)O$_3$-based compound. If perovskite compounds, for example, Ca(Zr,Ti)O$_3$-based compounds, undergo reduction, they will have semiconducting properties and thus not be able to exhibit superior dielectric properties.

The internal electrodes may include any metallic material as long as the internal electrodes include copper (Cu) as a main component. The metallic material may include a metal other than copper, for example, nickel (Ni), silver (Ag), or palladium (Pd). The metallic material in the internal electrodes may be an elementary metal or an alloy. Examples of the alloy include Cu—Ni alloys and Cu—Ag alloys. In addition to the metal, the internal electrodes may also include a ceramic component. The ceramic component may be a component of the dielectric layer, for example, a particle of a main component of the dielectric layer. The internal electrodes include, as an additive, a component of the dielectric layer that is able to contract similar to the dielectric layer, to significantly reduce or prevent problems, for example, interface delamination during firing.

The internal electrodes each preferably have a thickness of about 0.5 μm or more and about 3.0 μm or less, for example. The number of the internal electrodes is preferably three or more and 70 or less, for example.

In a second preferred embodiment of the present invention, the multiple internal electrodes may include an internal electrode group including two internal electrode layers between which the dielectric layer is sandwiched, and the two internal electrode layers in the internal electrode group may be electrically connected to the same external electrode. That is, the two internal electrode layers with the dielectric layer in between them may be connected to one of the external electrodes provided on both end surfaces so that they are electrically at the same potential.

Figure 2:
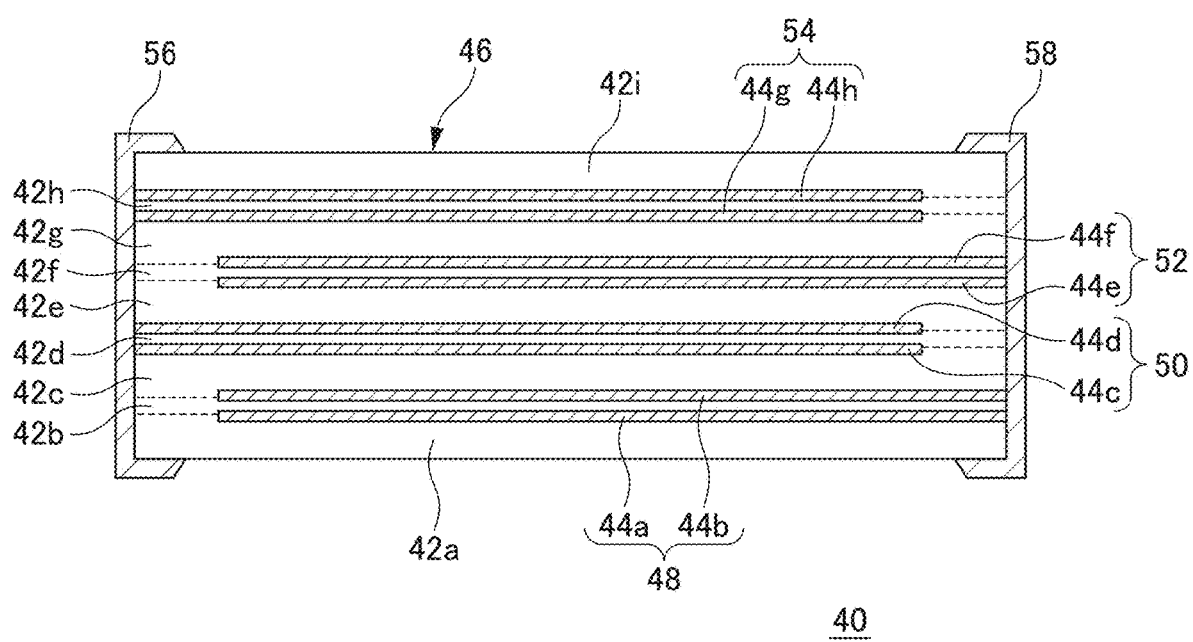
FIG. 2 is a cross-sectional view showing a multilayer ceramic capacitor according to a second preferred embodiment of the present invention.

The second preferred embodiment is described with reference to FIG. 2. FIG. 2 shows a multilayer ceramic capacitor 40 including dielectric layers 42a to 42i, internal electrodes 44a to 44h, and external electrodes 56 and 58. The internal electrodes 44a and 44b define an internal electrode group 48 including a pair of internal electrode layers, and the internal electrode group 48 is connected to one external electrode 58. The internal electrodes 44c and 44d define an internal electrode group 50 including a pair of internal electrode layers, and are connected to the other external electrode 56. Similarly, the other internal electrodes 44e to 44h define the internal electrode groups 52 and 54 and are connected to one of the external electrodes 56 and 58.

A pair of internal electrode layers (an internal electrode group) is able to provide the same or substantially the same advantageous effects as those produced when the thickness of the corresponding internal electrode is increased, and thus the equivalent series resistance is able to be reduced. Accordingly, the loss of the multilayer ceramic capacitor is able to be further reduced.

External Electrodes

The external electrodes may have features known in the art. For example, the external electrodes may each include a base electrode layer and an upper electrode layer provided on the base electrode layer. The base electrode layer preferably includes an electrically-conductive metal and a glass frit, for example. Examples of the electrically-conductive metal include silver (Ag), nickel (Ni), copper (Cu), palladium (Pd), and other metals. The glass frit may be a glass material including, for example, barium (Ba), strontium (Sr), calcium (Ca), boron (B), lithium (Li), sodium (Na), and other components.

The upper electrode layer may be a monolayer structure or a multilayer structure. For example, the upper electrode layer may be a two-layer structure including a first upper electrode layer and a second upper electrode layer provided thereon. Either or both of the upper electrode layers (the first upper electrode layer and the second upper electrode layer) may include a plating film or an electrically-conductive resin. A plating film as the upper electrode layer may be formed by plating a metal, such as, for example, copper (Cu), nickel (Ni), silver (Ag), palladium (Pd), or gold (Au). The upper electrode layer of an electrically-conductive resin may include a thermosetting resin and a metal filler. The thermosetting resin may be, for example, epoxy resin, phenolic resin, urethane resin, silicone resin, polyimide resin, or any other known thermosetting resin. The thermosetting resin may further include a curing agent. The metal filler may be made of, for example, copper (Cu), silver (Ag), or any other metal.

Method for Manufacturing Multilayer Ceramic Capacitor

The multilayer ceramic capacitor according to the present preferred embodiment may be manufactured by any method that is able to provide the features described above. Hereinafter, however, a non-limiting example of a preferred manufacturing method will be described.

First, a main component powder is prepared, which forms the main crystal grains of the dielectric layers. The main component powder, which includes components to form the main crystal grains, for example, Ca, Sr, and Zr, may be synthesized by a known method, for example, a solid-state reaction method, a hydrothermal synthesis method, a coprecipitation method, or an alkaline hydrolysis method.

The synthesis by a solid-state reaction method may be performed, for example, according to the following procedure. First, a raw material powder or powders are prepared including components to form the main crystal grains, for example, Ca, Sr, and Zr. The raw material powder may include, for example, an oxide, a carbonate, a nitrate, a hydroxide, an organic acid salt, an alkoxide, and/or a chelate compound. The raw material powder may also include components in the form of a mixture or a compound. Subsequently, the raw material powders are mixed to form a mixture, which is then calcined. The calcination may be performed under known conditions. For example, the calcination may be performed in the air atmosphere under conditions to hold at a temperature of about 1,000° C. or more and about 1,350° C. or less for about 1 hour or more and about 12 hours or less, for example. If necessary, the calcined product may be pulverized.

Separately from the main component powder, an additive component powder is prepared, which forms an additive component. The additive component powder includes at least lithium (Li). The additive component powder may also include other components, for example, silicon (Si), manganese (Mn), and vanadium (V). The additive component powder may include, for example, an oxide, a carbonate, a nitrate, a hydroxide, an organic acid salt, an alkoxide, and/or a chelating compound. The additive component powder may be synthesized from an additive component raw material by a solid-state method, a hydrothermal synthesis method, a coprecipitation method, an alkaline hydrolysis method, or any other method, for example.

Subsequently, an organic binder and a solvent are added to and mixed with the main component powder and the additive component powder to form a slurry, which is then formed into ceramic green sheets. The organic binder may be a known binder, for example, a polyvinyl butyral resin. The solvent may be a known organic solvent, for example, toluene or ethanol. A plasticizer may also be added to the slurry. The sheets may be formed using a known method, for example, a doctor blade method.

An electrically-conductive paste is applied to the surface of the prepared green sheet and then dried to form an electrically-conductive paste film. The electrically-conductive paste may be prepared in advance by adding an organic binder and a solvent to a copper (Cu)-including electrically-conductive powder and mixing them. The electrically-conductive paste may be applied by a known method, for example, screen printing or gravure printing.

Multiple green sheets each with the electrically-conductive paste film are prepared and then stacked and bonded together under pressure to form a compact. In this process, green sheets with no electrically-conductive paste film may be included as some of the green sheets to be stacked.

Subsequently, the resulting compact is fired to form a sintered body. The sintered body corresponds to the multilayer body of the multilayer ceramic capacitor. During the firing, the ceramic green sheets turn into dielectric layers, and the electrically-conductive paste films turn into internal electrodes. The firing may be performed under known conditions, for example, holding in a nitrogen-water-hydrogen non-oxidizing atmosphere at a temperature of about 900° C. or more and about 1,030° C. or less for about 1 hour or more and about 10 hours or less. During the firing, Li as an additive component may partially dissipate (volatilize). Therefore, during the mixing of additive components, the Li component should preferably be added in an amount that provides a margin for the dissipation.

The resulting sintered body (multilayer body) is subjected to barrel polishing, and the lead portion of each internal electrode is exposed at the end surface of the sintered body. Subsequently, an external electrode is formed on the end surface. First, a base electrode layer is formed by applying, to the end surface of the sintered body, an electrically-conductive paste including an electrically-conductive metal powder, for example, copper (Cu), and a glass frit, and then baking the applied paste. Subsequently, an upper electrode layer including a plating film or an electrically-conductive resin layer is formed on the base electrode layer. Alternatively, the upper electrode layer including an electrically-conductive resin may be formed, for example, by kneading a thermosetting resin, a metal filler, and optionally a curing agent, then applying the resulting mixture to the surface of the base electrode layer, and then curing the mixture. The multilayer ceramic capacitor is manufactured as described above.

Preferred embodiments of the present invention will be described in more detail with reference to examples and comparative examples below. It will be understood, however, that the examples shown below are not intended to limit the scope of the present invention.

(1) Manufacture of Multilayer Ceramic Capacitors

Examples 1 to 34

Calcium carbonate ($CaCO_3$), strontium carbonate ($SrCO_3$), titanium oxide ($TiO_2$), and zirconium oxide ($ZrO_2$), which were powdery and had a purity of about 99% or more, were provided as main component raw materials. The main component raw materials were weighed and then subjected to wet mixing using a ball mill. The resulting mixture was dried and then crushed to form a powdery mixture. The resulting powdery mixture was calcined in air under conditions at about 1,200° C. for about 2 hours and then crushed to form a main component powder.

Silicon dioxide ($SiO_2$), manganese carbonate ($MnCO_3$), and lithium oxide ($Li_2O$), which were powdery, were provided as additive component powders. The main component powder and the additive component powders were weighed and then subjected to wet mixing using a ball mill. The resulting mixture was crushed and then dried to provide a dielectric layer material powder. The dielectric layer material powder (including the main component raw materials and the additive component powders) was formulated to provide the resulting multilayer ceramic capacitor with dielectric layers having the composition shown in Table 1. Specifically, $Li_2O$ was added in an amount of about 10% to about 80% by mass more than the Li amount shown in Table 1, to provide a margin for the partial dissipation (volatilization) of Li during the firing.

Subsequently, a slurry was prepared by adding a polyvinyl butyral binder and ethanol to the dielectric layer material powder, and then subjecting them to wet mixing using a ball mill. The resulting slurry was formed into a sheet by a doctor blade method. The resulting sheet was cut into about 15 cm×about 15 cm square sheets each with a thickness of about 3.0 μm to about 7.0 μm, so that ceramic green sheets were obtained.

An electrically-conductive paste including copper (Cu) as a main component was printed on the surface of each of the resulting ceramic green sheets to form an electrically-conductive paste film that provides an internal electrode. The multiple ceramic green sheets each with the electrically-conductive paste film were stacked and bonded together under pressure. The resulting stack was cut into multilayer chips. In this process, the ceramic green sheets were stacked and bonded together under pressure, and two of the electrically-conductive paste films, between which one of the ceramic green sheets was sandwiched, extended to the same end surface. Subsequently, each of the resulting multilayer chips was heated in air at about 250° C. to burn out the binder, and then the resulting product was fired in a nitrogen-water-hydrogen non-oxidizing atmosphere at about 1,000° C. to provide a multilayer body including dielectric layers and internal electrodes.

Subsequently, the multilayer body was subjected to barrel polishing, and the lead portions of the internal electrodes were exposed at the end surfaces. An electrically-conductive paste including a copper (Cu) powder and a glass frit was applied to the end surfaces of the multilayer body and then dried. The electrically-conductive paste was then fired in a non-oxidizing atmosphere at about 800° C. to form base electrode layers. Subsequently, a nickel (Ni) plating film was formed on each of the base electrode layers by barrel plating, and then a tin (Sn) plating film was formed on the nickel (Ni) plating film by barrel plating, so that external electrodes were formed. A multilayer ceramic capacitor was prepared as described above.

The prepared ceramic capacitor had the following external dimensions: a width of about 1.2 mm, a length of about 2.0 mm, and a height of about 0.6 mm. The dielectric layers had an average thickness of about 2.4 μm to about 5.6 μm, and the number of the dielectric layers was 40. The internal electrode layers had an average thickness of about 1.4 μm.

(2) Evaluation

Characteristics of the multilayer ceramic capacitors of Examples 1 to 34 were evaluated as described below.

Composition

Polishing was performed to remove the external electrodes from the multilayer ceramic capacitor. The resulting multilayer body was dissolved by an alkali fusion method, and the resulting solution was subjected to inductively coupled plasma (ICP) analysis. The content of the internal electrode component (Cu) was subtracted from the data resulting from the analysis, and the content of each component in the dielectric layers was determined.

TOF-SIMS

The distribution of lithium ions (Li$^+$) and copper ions (Cu$^+$) in an LT cross-section was analyzed at the transverse (L direction) center of the multilayer ceramic capacitor by time-of-flight secondary ion mass spectrometry (TOF-SIMS) to provide a secondary ion mapping image.

For the analysis, the sample was pretreated under the following conditions:
  Ion milling: IM3000 manufactured by Hitachi High-Technologies Corporation, 3 keV/4.0 mm/mode 3
  TOF-SIMS: Bi-DC cleaning, about 500 μm square, 1 shot/pixel, 2 scans The analysis was performed under the following conditions.
  System: TOF.SIMS 5 manufactured by ION-TOF Inc.
  Primary ion: Bi$^+$ (acceleration voltage about 25 kV)
  Secondary ion polarity: Positive ion
  Measurement area: 30 μm square, about 50 μm square
  Number of scans: 16 or 8
  Number of pixels: 256×256 pixels
  Number of shots per pixel: 1
  Charge correction: Required The standard deviation of Li concentrations was calculated according to the procedure shown below using the result of the analysis. The resulting image, which was divided into 256×256 pixels, was used to determine the lithium (Li) concentrations at all pixels in the stacking direction. The maximum of the standard deviations calculated from the lithium (Li) concentrations was determined to be the standard deviation of Li concentrations in the thickness direction. Moreover, the maximum of the standard deviations calculated from the Li concentrations at all pixels in the direction perpendicular to the stacking direction was determined to be the standard deviation of Li concentrations in the direction perpendicular to the stacking direction (or in the in-plane direction). In this process, the standard deviation ($\sigma$) was calculated according to formula (1) below using the Li concentrations ($x_i$ (i=1, 2, ..., n)) at the respective pixels in the thickness direction or in the direction perpendicular thereto and using the average (m) of the Li concentrations.

Formula 1

$$\sigma = \sqrt{\frac{1}{n}\sum_{i=1}^{n}(x_i - m)^2} \quad (1)$$

High-Temperature Reliability

The multilayer ceramic capacitor was mounted on an epoxy resin board and then subjected to a high-temperature load test under conditions including a temperature of about 125° C. and an applied voltage of about 25 V to about 200 V. When the multilayer ceramic capacitor had an insulation resistance of less than about 10$^6$Ω after about 1,000 hours of the test, it was evaluated as defective. The applied voltage was determined at which none of 100 samples were evaluated as defective. Subsequently, the electric field intensity was calculated from the applied voltage and the average thickness of the dielectric layers of the sample and defined as the non-defect-inducing field intensity.

(3) Results

Table 1 collectively shows the evaluation results obtained for Examples 1 to 34. Examples 2 to 33 are according to the present invention, in which the deviation of Li concentrations in the thickness direction is about 1.03 at. % or less. Example 1 and Example 34 are comparative examples in which the deviation of Li concentrations in the thickness direction is more than about 1.03 at. %. As shown in Table 1, the samples of the comparative examples (Examples 1 and Example 34) with a higher Li concentration deviation in the thickness direction showed a non-defect-inducing field intensity as low as about 4.5 V/μm in the high-temperature reliability test.

The samples of the examples (Examples 2 to 33) with a lower Li concentration deviation in the thickness direction showed a non-defect-inducing field intensity as high as at least about 8.9 V/μm. In particular, the samples of the examples with a lower Li concentration deviation in the thickness direction and with the main component powder composition and the additive component composition being within a predetermined range (Examples 2 to 10, 14, 16, 18, 21, 24, 27, 28, 30, and 31) provided relatively high non-defect-inducing field intensities. Accordingly, it was determined that the multilayer ceramic capacitors having dielectric layers with a thickness-direction Li concentration deviation being within a predetermined range have relatively high reliability.

Figure 3:
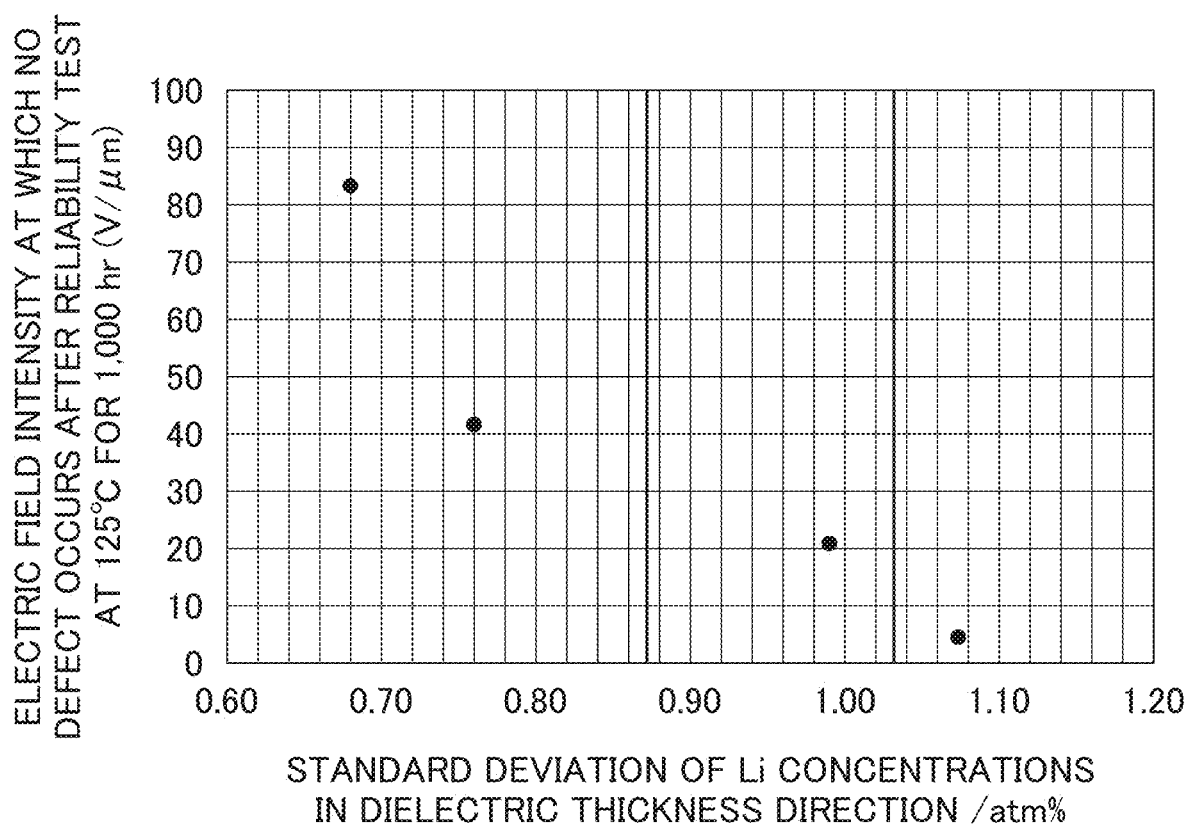
FIG. 3 is a graph showing the relationship between the Li concentration deviation in the thickness direction of dielectric layers and the electric field intensity at which the insulation resistance remains not less than about $10^6 \Omega$ in a high-temperature load test.
Figure 4:
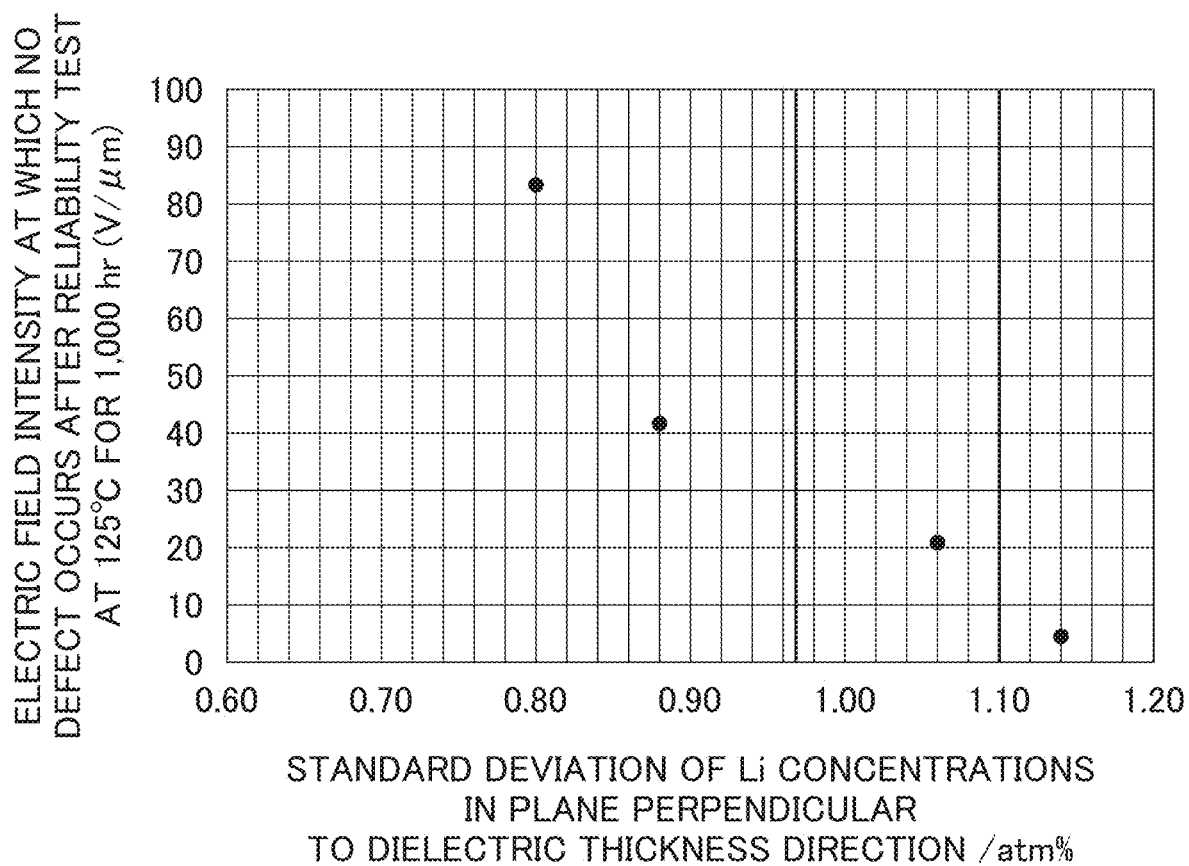
FIG. 4 is a graph showing the relationship between the in-plane deviation of Li concentrations of dielectric layers and the electric field intensity at which the insulation resistance remains not less than about $10^6 \Omega$ in a high-temperature load test.

FIGS. 3 to 5 are graphs showing the relationship between the non-defect-inducing field strength and the thickness-direction Li concentration deviation, the in-plane-direction Li concentration deviation, or the Li content with respect to Examples 1 to 4. The lower the thickness-direction Li concentration deviation, the higher the non-defect-inducing field intensity. In particular, Example 4 with a thickness-direction Li concentration deviation as low as about 0.68 at. % showed a very high non-defect-inducing field intensity of about 83.3 V/μm.

Figure 6A:
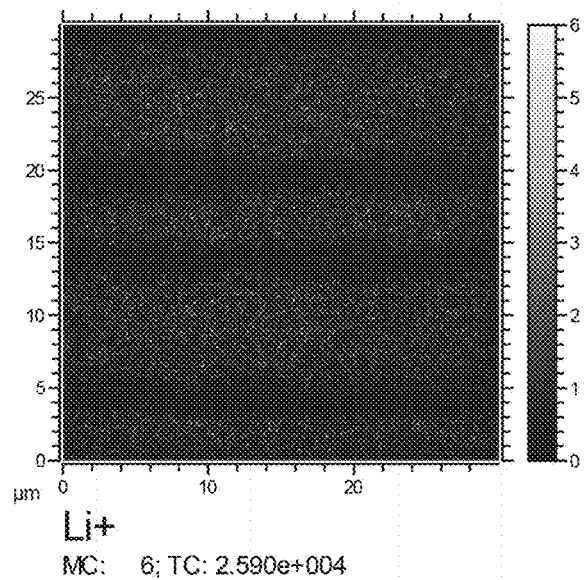
FIGS. 6A to 6C are views showing secondary ion mapping images of the LT surface of a multilayer ceramic capacitor.
Figure 6B:
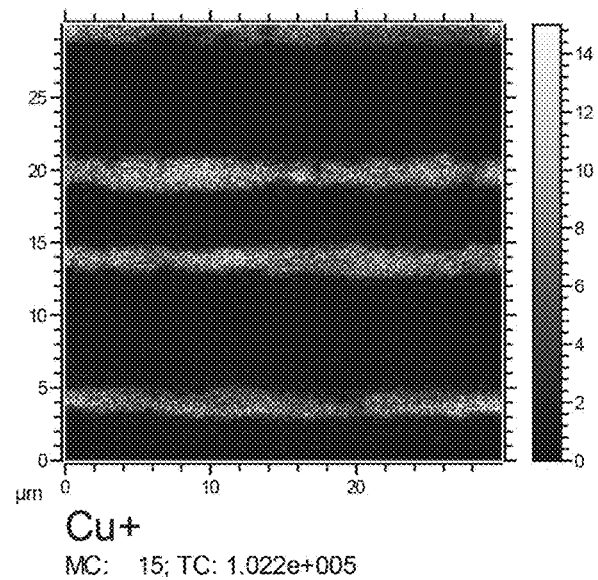
Figure 6C:
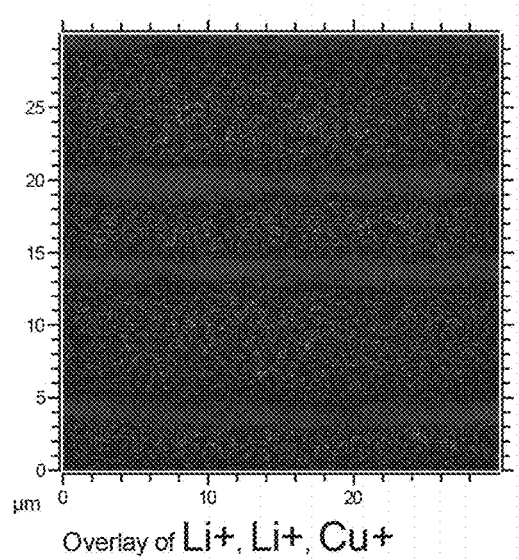

FIGS. 6A to 6C respectively show a lithium ion (Li$^+$) mapping image, a copper ion (Cu$^+$) mapping image, and a superimposition of these mapping images with respect to the sample of Example 2 according to the present invention. In the dielectric layers, Li was relatively uniformly distributed with no segregation observed. Cu was also found only at the place of the internal electrodes, and diffusion of Cu into the dielectric layers was not observed. As a result, the Li distribution was clearly distinct from the Cu distribution.

TABLE 1

| | Composition and Characteristics of Multilayer Ceramic Capacitors | | | | | | | | | | |
|---|---|---|---|---|---|---|---|---|---|---|---|
| Example | Ca 1-x-y | Sr x | Ba y | a/b n | Zr 1-z-α | Ti z | Hf α | Si mass % | Mn mass % | V mass % | Li mass % |
| *1 | 0.985 | 0.015 | 0.0001 | 1.10 | 0.968 | 0.020 | 0.012 | 3.0 | 4.5 | 0.00 | 0.196 |
| 2 | 0.985 | 0.015 | 0.000 | 1.04 | 0.970 | 0.018 | 3.012 | 1.7 | 3.5 | 0.00 | 0.093 |
| 3 | 0.985 | 0.015 | 0.000 | 1.07 | 0.970 | 0.018 | 0.012 | 1.7 | 3.5 | 0.00 | 0.059 |
| 4 | 0.985 | 0.015 | 0.000 | 1.07 | 0.970 | 0.018 | 0.012 | 1.7 | 3.5 | 0.00 | 0.009 |
| 5 | 1.000 | 0.000 | 0.000 | 1.04 | 0.970 | 0.018 | 0.012 | 1.7 | 3.5 | 0.00 | 0.100 |
| 6 | 0.500 | 0.500 | 0.000 | 1.04 | 0.970 | 0.018 | 0.012 | 1.7 | 3.5 | 0.00 | 0.100 |

TABLE 1-continued

Composition and Characteristics of Multilayer Ceramic Capacitors

| Example | | | | | | | | | | | |
|---|---|---|---|---|---|---|---|---|---|---|---|
| 7 | 0.000 | 1.000 | 0.000 | 1.04 | 0.970 | 0.018 | 0.012 | 1.7 | 3.5 | 0.00 | 0.100 |
| 8 | 0.000 | 0.600 | 0.400 | 1.04 | 0.970 | 0.018 | 0.012 | 1.7 | 3.5 | 0.00 | 0.100 |
| 9 | 0.300 | 0.300 | 0.400 | 1.04 | 0.970 | 0.016 | 0.012 | 1.7 | 3.5 | 0.00 | 0.100 |
| 10 | 0.600 | 0.00 | 0.400 | 1.04 | 0.970 | 0.018 | 0.012 | 1.7 | 3.5 | 0.00 | 0.100 |
| 11 | 0.550 | 0.000 | 0.450 | 1.04 | 0.970 | 0.018 | 0.012 | 1.7 | 3.5 | 0.00 | 0.100 |
| 12 | 0.000 | 0.550 | 0.450 | 1.04 | 0.970 | 0.018 | 0.012 | 1.7 | 3.5 | 0.00 | 0.100 |
| 13 | 0.985 | 0.015 | 0.000 | 0.93 | 0.970 | 0.018 | 0.012 | 1.7 | 3.5 | 0.00 | 0.100 |
| 14 | 0.985 | 0.015 | 0.000 | 1.01 | 0.970 | 0.018 | 0.012 | 1.7 | 3.5 | 0.00 | 0.100 |
| 15 | 0.985 | 0.015 | 0.000 | 1.13 | 0.970 | 0.018 | 0.012 | 1.7 | 3.5 | 0.00 | 0.100 |
| 16 | 0.985 | 0.015 | 0.000 | 1.04 | 0.795 | 0.200 | 0.005 | 1.7 | 3.5 | 0.00 | 0.100 |
| 17 | 0.985 | 0.015 | 0.000 | 1.04 | 0.895 | 0.300 | 0.005 | 1.7 | 3.5 | 0.00 | 0.100 |
| 18 | 0.985 | 0 015 | 0.000 | 1.01 | 0.500 | 0.200 | 0.300 | 1.7 | 3.5 | 0.00 | 0.100 |
| 19 | 0.985 | 0.015 | 0.000 | 1.01 | 0.450 | 0.250 | 0.300 | 1.7 | 3.5 | 0.00 | 0.100 |
| 20 | 0.985 | 0.015 | 0.000 | 1.01 | 0.450 | 0.200 | 0.350 | 1.4 | 3.5 | 0.00 | 0.100 |
| 21 | 0.985 | 0.015 | 0.000 | 1.01 | 0.695 | 0.005 | 0.300 | 1.7 | 3.5 | 0.00 | 0.100 |
| 22 | 0.985 | 0.015 | 0.000 | 1.01 | 0.645 | 0.005 | 0.350 | 1.7 | 3.5 | 0.00 | 0.100 |
| 23 | 0.985 | 0.025 | 0.000 | 1.01 | 0.970 | 0.018 | 0.012 | 0.2 | 3.5 | 0.00 | 0.140 |
| 24 | 0.985 | 0.015 | 0.000 | 1.07 | 0.970 | 0.018 | 0.012 | 4.5 | 3.5 | 0.00 | 0.100 |
| 25 | 0.985 | 0.015 | 0.000 | 1.07 | 0.370 | 0.018 | 0.012 | 5.0 | 3.5 | 0.00 | 0.100 |
| 26 | 0.985 | 0.015 | 0.000 | 1.01 | 0.970 | 0.018 | 0.012 | 1.7 | 0.2 | 0.00 | 0.140 |
| 27 | 0.985 | 0.015 | 0.000 | 1.01 | 0.970 | 0.018 | 0.012 | 1.7 | 0.4 | 0.00 | 0.140 |
| 28 | 0.985 | 0.015 | 0.000 | 1.07 | 0.370 | 0.018 | 0.012 | 1.7 | 9.5 | 0.00 | 0.100 |
| 29 | 0.985 | 0.015 | 0.000 | 1.07 | 0.970 | 0.018 | 0.012 | 1.7 | 6.5 | 0.00 | 0.100 |
| 30 | 0.985 | 0.015 | 0.000 | 1.04 | 0.970 | 0.018 | 0.012 | 1.7 | 3.5 | 0.06 | 0.100 |
| 31 | 0.985 | 0.015 | 0.000 | 1.04 | 0.970 | 3.018 | 0.012 | 1.7 | 3.5 | 0.10 | 0.100 |
| 32 | 0.985 | 0.015 | 0.000 | 1.04 | 0.970 | 0.018 | 0.012 | 1.7 | 3.5 | 0.13 | 0.100 |
| 33 | 0.985 | 0.015 | 0.000 | 1.04 | 0.970 | 0.018 | 0.012 | 1.7 | 3.5 | 0.00 | 0.003 |
| *34 | 0.985 | 0.015 | 0.000 | 1.04 | 0.970 | 0.018 | 0.012 | 1.7 | 3.5 | 0.00 | 0.150 |

| Example | Standard deviation of Li concentrations in cross-section in thickness direction atm % | Standard deviation of Li concentrations in plane perpendicular to thickness direction atm % | Average thickness of dielectric layers in sample μm | Voltage at which no defect occurs in high-temperature reliability test V | Field intensity at which no defect occurs in high-temperature reliability test V/μm |
|---|---|---|---|---|---|
| *1 | 1.07 | 1.14 | 5.6 | 25 | 4.5 |
| 2 | 0.99 | 1.06 | 4.8 | 100 | 20.8 |
| 3 | 0.76 | 0.88 | 4.8 | 200 | 41.7 |
| 4 | 0.68 | 0.80 | 2.4 | 200 | 83.3 |
| 5 | 1.00 | 1.08 | 5.6 | 100 | 17.9 |
| 6 | 0.97 | 1.05 | 5.6 | 63 | 11.3 |
| 7 | 1.01 | 1.09 | 5.6 | 63 | 11.3 |
| 8 | 0.88 | 0.99 | 5.6 | 63 | 11.3 |
| 9 | 0.92 | 1.01 | 5.6 | 63 | 11.3 |
| 10 | 0.91 | 1.03 | 5.6 | 3.00 | 17.9 |
| 11 | 0.87 | 0.99 | 5.6 | 50 | 5.9 |
| 12 | 0.88 | 1.00 | 5.6 | 50 | 5.9 |
| 13 | 1.03 | 1.09 | 5.6 | 50 | 8.9 |
| 14 | 1.00 | 1.05 | 5.6 | 63 | 11.3 |
| 15 | 1.02 | 1.10 | 5.6 | 50 | 8.9 |
| 16 | 0.96 | 1.04 | 5.6 | 63 | 11.3 |
| 17 | 0.90 | 1.01 | 5.6 | 50 | 8.9 |
| 18 | 0.99 | 1.05 | 5.6 | 63 | 11.3 |
| 19 | 1.01 | 1.08 | 5.6 | 50 | 6.9 |
| 20 | 1.00 | 1.08 | 5.6 | 50 | 8.9 |
| 21 | 1.03 | 1.10 | 5.6 | 63 | 11.3 |
| 22 | 1.03 | 1.09 | 5.6 | 50 | 5.9 |
| 23 | 1.03 | 1.10 | 5.6 | 50 | 8.9 |
| 24 | 1.00 | 1.07 | 5.6 | 100 | 17.9 |
| 25 | 0.98 | 1.08 | 5.6 | 50 | 5.9 |
| 26 | 1.02 | 1.10 | 5.6 | 50 | 8.9 |
| 27 | 1.02 | 1.08 | 5.6 | 63 | 11.3 |
| 28 | 1.00 | 1.05 | 5.6 | 100 | 17.9 |
| 29 | 0.98 | 1.02 | 3.6 | 50 | 8.9 |
| 30 | 0.99 | 1.04 | 5.6 | 63 | 11.3 |
| 31 | 0.99 | 1.05 | 5.8 | 63 | 11.3 |
| 32 | 1.01 | 1.08 | 5.6 | 50 | 8.9 |
| 33 | 0.09 | 0.43 | 5.6 | 50 | 8.3 |
| *34 | 1.05 | 1.18 | 5.6 | 25 | 4.5 |

Note:
The asterisk "*" indicates a comparative example.

What is claimed is:

1. A multilayer ceramic capacitor comprising:
a multilayer body including a plurality of dielectric layers and a plurality of internal electrodes, the dielectric layers and the internal electrodes being stacked alternately; and
external electrodes provided on end surfaces of the multilayer body and electrically connected to the internal electrodes; wherein
the dielectric layers each include:
main crystal grains including calcium (Ca) and/or strontium (Sr), and zirconium (Zr); and
an additive component including lithium (Li);
the internal electrodes include copper (Cu); and
the dielectric layers include lithium (Li) concentrations with a standard deviation of about 1.03 atomic percent or less in a thickness direction.

2. The multilayer ceramic capacitor according to claim 1, wherein the dielectric layers have lithium (Li) concentrations with a standard deviation of about 1.10 atomic percent or less in a direction perpendicular or substantially perpendicular to the thickness direction.

3. The multilayer ceramic capacitor according to claim 1, wherein the main crystal grains have a composition represented by the formula $(Ca_{1-x-y}Sr_xBa_y)_m(Zr_{1-z-\alpha}Ti_zHf_\alpha)O_3$, where x is 0 or more and 1.0 or less, y is about 0 or more and 0.4 or less, m is 1.0 or more and 1.1 or less, z is 0 or more and 0.2 or less, and $\alpha$ is 0 or more and 0.3 or less.

4. A multilayer ceramic capacitor comprising:
a multilayer body including a plurality of dielectric layers and a plurality of internal electrodes, the dielectric layers and the internal electrodes being stacked alternately; and
external electrodes provided on end surfaces of the multilayer body and electrically connected to the internal electrodes; wherein
the dielectric layers each include:
main crystal grains including calcium (Ca) and/or strontium (Sr), and zirconium (Zr); and
an additive component including lithium (Li);
the internal electrodes include copper (Cu);
the dielectric layers include lithium (Li) concentrations with a standard deviation of about 1.03 atomic percent or less in a thickness direction; and
the dielectric layers include about 0.005% by mass or more and about 0.145% by mass or less of lithium (Li).

5. A multilayer ceramic capacitor comprising:
a multilayer body including a plurality of dielectric layers and a plurality of internal electrodes, the dielectric layers and the internal electrodes being stacked alternately; and
external electrodes provided on end surfaces of the multilayer body and electrically connected to the internal electrodes; wherein
the dielectric layers each include:
main crystal grains including calcium (Ca) and/or strontium (Sr), and zirconium (Zr); and
an additive component including lithium (Li);
the internal electrodes include copper (Cu);
the dielectric layers include lithium (Li) concentrations with a standard deviation of about 1.03 atomic percent or less in a thickness direction; and
the dielectric layers have lithium (Li) concentrations with a standard deviation of about 0.87 atomic percent or less in the thickness direction, have lithium (Li) concentrations with a standard deviation of about 0.97 atomic percent or less in a direction perpendicular or substantially perpendicular to the thickness direction, and include about 0.005% by mass or more and about 0.076% by mass or less of lithium (Li).

6. The multilayer ceramic capacitor according to claim 1, wherein the dielectric layers further include one or more elements selected from the group consisting of silicon (Si), manganese (Mn), and vanadium (V).

7. The multilayer ceramic capacitor according to claim 1, wherein the plurality of internal electrodes include an internal electrode group including two internal electrode layers between which a dielectric layer is sandwiched, and the two internal electrode layers in the internal electrode group are electrically connected to a same one of the external electrodes.

8. A multilayer ceramic capacitor comprising:
a multilayer body including a plurality of dielectric layers and a plurality of internal electrodes, the dielectric layers and the internal electrodes being stacked alternately; and
external electrodes provided on end surfaces of the multilayer body and electrically connected to the internal electrodes; wherein
the dielectric layers each include:
main crystal grains including calcium (Ca) and/or strontium (Sr), and zirconium (Zr); and
an additive component including lithium (Li);
the internal electrodes include copper (Cu);
the dielectric layers include lithium (Li) concentrations with a standard deviation of about 1.03 atomic percent or less in a thickness direction; and
each of the external electrodes includes a base electrode layer, a first upper electrode layer, and a second upper electrode layer.

9. The multilayer ceramic capacitor according to claim 8, wherein the base electrode layer includes an electrically-conductive metal and a glass frit.

10. The multilayer ceramic capacitor according to claim 8, wherein at least one of the first upper electrode layer and the second upper electrode layer includes a plating film or an electrically-conductive resin.

11. The multilayer ceramic capacitor according to claim 1, wherein
the internal electrodes include a first internal electrode and a second internal electrode;
the external electrodes include a first external electrode and a second external electrode;
the first internal electrode is electrically connected to the first external electrode; and
the second internal electrode is electrically connected to the second external electrode.

12. The multilayer ceramic capacitor according to claim 1, wherein
the main crystal grains of each of the dielectric layers defines about 50% by mass or more of each of the dielectric layers; and
the additive component of each of the dielectric layers defines about 50% by mass or less of each of the dielectric layers.

13. The multilayer ceramic capacitor according to claim 1, wherein the main crystal grains each include a perovskite compound.

14. The multilayer ceramic capacitor according to claim 1, wherein each of the dielectric layers has a thickness of about 1.0 μm or more and about 55.0 μm or less.

15. The multilayer ceramic capacitor according to claim 1, wherein a number of the dielectric layers is one or more and 50 or less.

16. The multilayer ceramic capacitor according to claim 1, wherein copper (Cu) defines about 50% by mass or more of each of the internal electrodes.

17. The multilayer ceramic capacitor according to claim 1, wherein the internal electrodes further include one or more elements selected from the group consisting of nickel (Ni), silver (Ag), and palladium (Pd).

18. The multilayer ceramic capacitor according to claim 1, wherein each of the internal electrodes has a thickness of about 0.5 μm or more and about 3.0 μm or less.

19. The multilayer ceramic capacitor according to claim 1, wherein a number of the internal electrodes is three or more and 70 or less.

* * * * *